United States Patent
Bailey (10) Patent No.: US 9,286,664 B2
(45) Date of Patent: Mar. 15, 2016

(54) SYSTEM AND METHOD FOR BLIND IMAGE DECONVOLUTION

(71) Applicant: DRS RSTA, INC., Melbourne, FL (US)

(72) Inventor: John R. Bailey, Merritt Island, FL (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 0 days.

(21) Appl. No.: 14/206,164

(22) Filed: Mar. 12, 2014

(65) Prior Publication Data
US 2014/0267915 A1    Sep. 18, 2014

Related U.S. Application Data

(60) Provisional application No. 61/778,181, filed on Mar. 12, 2013.

(51) Int. Cl.
*G06T 5/00* (2006.01)
*H04N 5/14* (2006.01)

(52) U.S. Cl.
CPC *G06T 5/003* (2013.01); *H04N 5/14* (2013.01); *G06T 2207/10016* (2013.01)

(58) Field of Classification Search
CPC .............. H04N 5/911; G06T 5/003; G06T 2207/10016
See application file for complete search history.

(56) References Cited

U.S. PATENT DOCUMENTS

| 6,888,564 | B2* | 5/2005 | Caviedes et al. | 348/180 |
| 8,064,717 | B2 | 11/2011 | Batur | |
| 8,351,726 | B2 | 1/2013 | Albu et al. | |
| 8,913,184 | B1* | 12/2014 | Sahu et al. | 348/441 |
| 2006/0177145 | A1* | 8/2006 | Lee et al. | 382/255 |
| 2007/0098292 | A1* | 5/2007 | Batur | 382/261 |
| 2010/0329582 | A1* | 12/2010 | Albu et al. | 348/208.4 |

OTHER PUBLICATIONS

International Search Report and Written Opinion mailed Aug. 5, 2014 in Int'l Patent Application No. PCT/US2014/024600, 10 pages.
International Preliminary Report on Patentability mailed Sep. 24, 2015 in Int'l Patent Application No. PCT/US2014/024600, 9 pages.

* cited by examiner

*Primary Examiner* — Gevell Selby
(74) *Attorney, Agent, or Firm* — Kilpatrick Townsend & Stockton LLP (57) ABSTRACT

Embodiments are directed to systems and methods for blind image deconvolution. One method of blind image deconvolution comprises capturing a video using an imaging device and measuring a sharpness degradation metric for the video. The method further comprises determining parameters of a point spread function (PSF) corresponding to the sharpness degradation metric using a predetermined equation and performing deconvolution on at least one frame of the video using the PSF and the determined parameters.

17 Claims, 5 Drawing Sheets

SYSTEM AND METHOD FOR BLIND IMAGE DECONVOLUTION

CROSS-REFERENCES TO RELATED APPLICATIONS

This application claims priority to U.S. Provisional Patent Application No. 61/778,181, filed Mar. 12, 2013, entitled "System and Method for Blind Image Deconvolution,", the disclosure of which is hereby incorporated in its entirety by reference for all purposes.

BACKGROUND

Embodiments of the present invention are related to digital image processing and, in particular, to blind image deconvolution.

Convolution refers to a mathematical operation by which two functions are combined to form a third function. Deconvolution refers to reversing the effects of convolution. Deconvolution is commonly used in image processing applications to remove the effects of distortion in an image. In image processing, a preprocessed image can be thought of as the convolution of a first function, i.e., the sharp image, and a second function, i.e., a point spread function (PSF) which introduces distortion to the preprocessed image. Deconvolution of the preprocessed image enables the underlying sharp image to be separated from the distortion introduced by the PSF, improving image quality. In images where atmospheric turbulence is the primary source of image distortion, the PSF can refer to the atmospheric PSF.

Blind deconvolution refers to the idea that the PSF is unknown. To effectively remove the distortion introduced by the unknown PSF, the unknown PSF needs to be estimated or modeled. Prior art methods exist for automatically computing the point spread function from raw video data for use in a deconvolution algorithm. However, these methods are typically very computationally intensive, for example involving extensive iterations or complex algorithms. These previous techniques require substantial computation time and resources. This increases system resource requirements and power consumption, making it more difficult to incorporate these techniques into portable applications.

Embodiments of the present invention address these and other problems.

SUMMARY OF THE INVENTION

Embodiments of the present invention are directed to blind image deconvolution of images and/or video that require much less computation than previous methods. In accordance with an embodiment, an unknown parameter (or parameters) of a predetermined mathematical model of a point spread function (PSF) that correlates with the amount of distortion in a signal can be automatically determined. This parameter(s) can then be used in deconvolution techniques to remove distortion from an image and display a stable, clear image to the user.

In accordance with an embodiment, a method of image deconvolution can include capturing a video comprising a plurality of frames using an imaging device; measuring a sharpness degradation metric for the video; determining one or more parameters of a point spread function (PSF) corresponding to the sharpness degradation metric; and performing deconvolution on at least one frame of the video using the PSF with the one or more parameters.

In some embodiments, the sharpness degradation metric for the video can be determined by calculating a mean image in the video; determining a first sharpness metric for the mean image, wherein the mean image is determined using a subset of the plurality of frames from the video; determining a second sharpness metric for a frame from the plurality of frames; and dividing the first sharpness metric by the second sharpness metric. In some embodiments, the first and second sharpness metrics are determined using an edge detection algorithm.

In some embodiments, the one or more parameters of a point spread function (PSF) corresponding to the sharpness degradation metric can be determined by calculating the one or more parameters using a predetermined equation based on the sharpness degradation metric. In some embodiments, the predetermined equation is generated by: identifying one or more parameters of a PSF for each of a plurality of training videos; determining a sharpness degradation metric for each of the plurality of training videos; and determining an equation to relate the parameters of the PSF for each of the plurality of training videos to the sharpness degradation metrics determined for each of the plurality of training videos using a curve fitting algorithm. In some embodiments, the curve fitting algorithm can be the method of least squares.

In accordance with an embodiment, a system for image deconvolution can include an image capture device configured capture video comprising a plurality of frames; and an image processing device configured to receive and process the video. The image processing device can measure a sharpness degradation metric for the video; determine one or more parameters of a point spread function (PSF) corresponding to the sharpness degradation metric; and perform deconvolution on at least one frame of the video using the PSF with the one or more parameters.

In some embodiments, the image capture device can store the captured video in a database, and the image processing device can retrieve the video from the database. In other embodiments, the image processing device can receive the video from the image capture device in real time.

Additional embodiments and features are set forth in part in the description that follows, and in part will become apparent to those skilled in the art upon examination of the specification, or may be learned by the practice of the disclosed embodiments. The features and advantages of the disclosed embodiments can be realized and attained by means of the instrumentalities, combinations, and methods described in the specification.

In the appended figures, similar components and/or features may have the same numerical reference label. Further, various components of the same type may be distinguished by following the reference by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Embodiments of the present invention are directed to reducing observed distortion, from video and/or images.

In accordance with an embodiment, the distortion present in an image can be correlated with the sharpness of the image. Distortion can be caused by atmospheric turbulence and other sources of distortion such as camera motion and optical irregularities. The sharpness of the image can be normalized to reduce the effects of secondary sources of distortion. The correlation of distortion of an image to its sharpness can be predetermined using a plurality of training videos. Each training video can show a different level of distortion. For each training video, parameters of a predetermined point spread function (PSF) model can be calculated, using any conventional method known in the art. Additionally, a sharpness degradation metric can be calculated for each training video. The calculated PSFs and sharpness degradation metrics can then be correlated to determine a function which relates a video's PSF to its sharpness degradation metric.

In some embodiments, the predetermined PSF can be applied to live video. As live video is received, the system can determine a sharpness degradation metric for the live video. Using the sharpness metric and the predetermined function, the parameters of the PSF for the live video can be determined. The predetermined PSF, and the parameters determined for the live video, can then be used in the deconvolution processing of the live video to substantially reduce the turbulence present in the live video, resulting in a sharper, clearer image.

Figure 1:
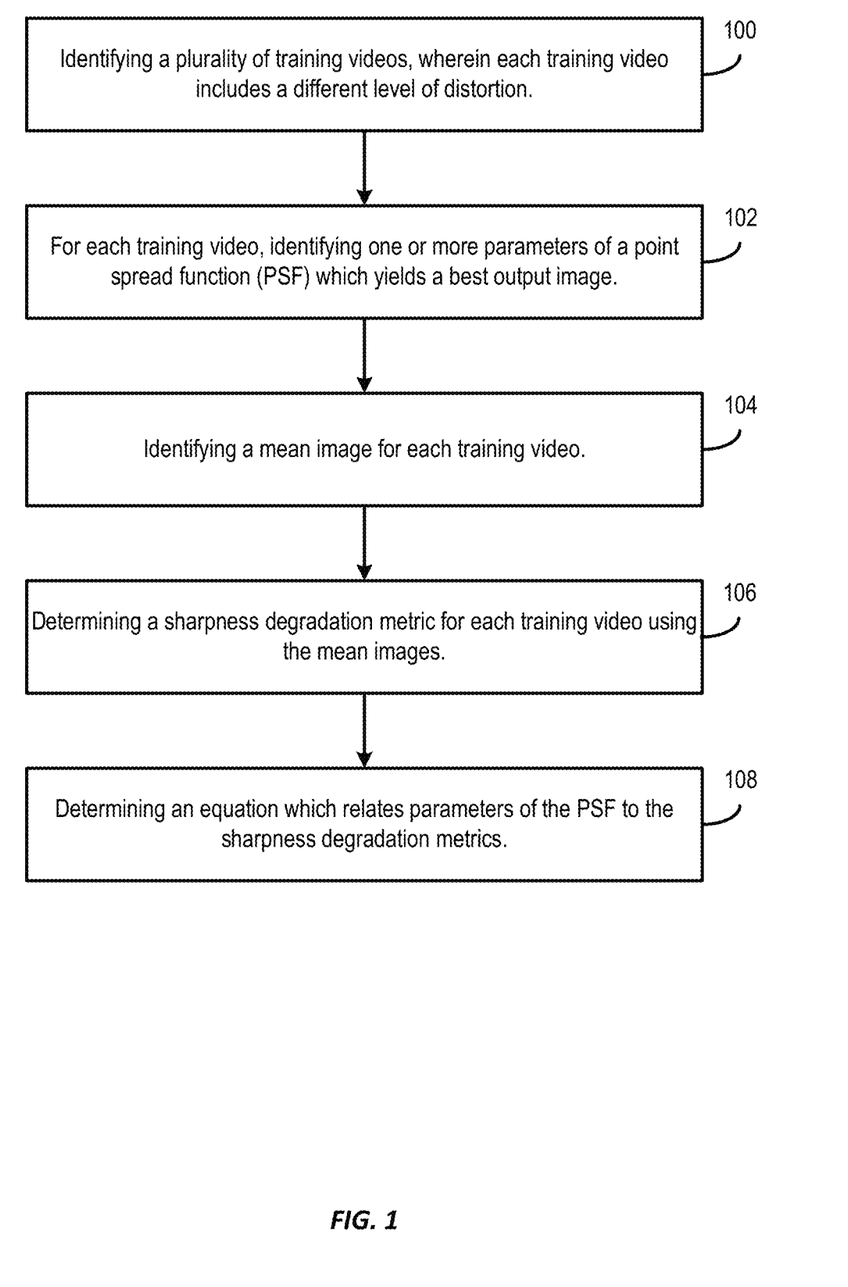
FIG. 1 shows a method of correlating distortion with image sharpness, in accordance with an embodiment.

FIG. 1 shows a method of correlating distortion with image sharpness, in accordance with an embodiment. In accordance with an embodiment, turbulence can be correlated with image sharpness in an offline training mode. At 100, training videos are identified that show scenes including varying levels of distortion, such as atmospheric turbulence. In accordance with an embodiment, the training videos used can be selected for a particular application. For example, if an imaging device is going to be deployed in an urban setting, the training videos can be of urban environments.

At 102, a parameter or parameters of a point spread function model is determined for each training video. These PSF parameters can be determined experimentally, by iteratively changing the PSF and computing a new output image until the quality of the output image stops improving. The output image can be determined using the experimental value of the PSF and any conventional deconvolution algorithm. The identified PSF parameter or parameters is then recorded for each training video.

At 104, a mean image is then computed for each training video by registering N adjacent frames of the video together and then averaging them. In accordance with an embodiment, N can be any number of frames selected by the trainer, e.g., a developer or other user responsible for training the system using the training videos. In one embodiment, N may range between 15 to 30 frames. The sharpness of this mean image correlates with the amount of turbulence in the scene, i.e., the more turbulent the scene, the less sharp the mean image. At 106, a sharpness degradation metric is determined for each training video using that training video's mean image. To account for secondary sources of distortion, such as camera motion, the sharpness of the mean image can be normalized, by dividing it by the sharpness of one of the individual frames. The result is the sharpness degradation metric for that training video. The more turbulence present, the lower the sharpness degradation metric. Because each sharpness degradation metric is normalized for the scene itself and for any non-turbulence induced distortion that may be present in the video, it can be correlated with parameters of the predetermined PSF used to model the turbulence-induced distortion of the training video.

At 108, a best fit equation is determined which relates parameters of the PSF model to sharpness degradation metrics. In accordance with an embodiment, the method of least squares can be used to determine the best fit equation relating the experimentally determined parameter(s) of the PSF (the dependent variable) to the sharpness degradation metric (the independent variable). Other curve fitting algorithms may also be used to determine this best fit equation. The coefficients of the best fit equation can be stored and for later use, as discussed in greater detail below.

In embodiments where multiple parameters of the PSF can be estimated, a separate best fit equation can be determined for each parameter. For example, where two parameters of the PSF are estimated, a first best fit equation can be determined for the first parameter as a function of the sharpness degradation metric and a second best fit equation can be determined for the second parameter as a function of the sharpness degradation metric. Two sets of coefficients, one for each best fit equation, can then be stored. In some embodiments, a multi-dimensional best fit equation can be used, where each dimension corresponds to a different parameter.

In accordance with an embodiment, the coefficients of the best fit equation are predetermined, and the equation is invisible to the end user. Alternatively, the end user can train the system using videos captured by the user depicting common environments and turbulence in the end user's deployment environment. In some embodiments, a plurality of different best fit equations are predetermined, each applicable to a different deployment environment. The end user can select which best fit equation is appropriate for their immediate application or the imaging device can automatically identify the appropriate best fit equation. Each of the plurality of different best fit equations can be preloaded into the imaging device or can be dynamically added or removed by the end user.

Figure 2:
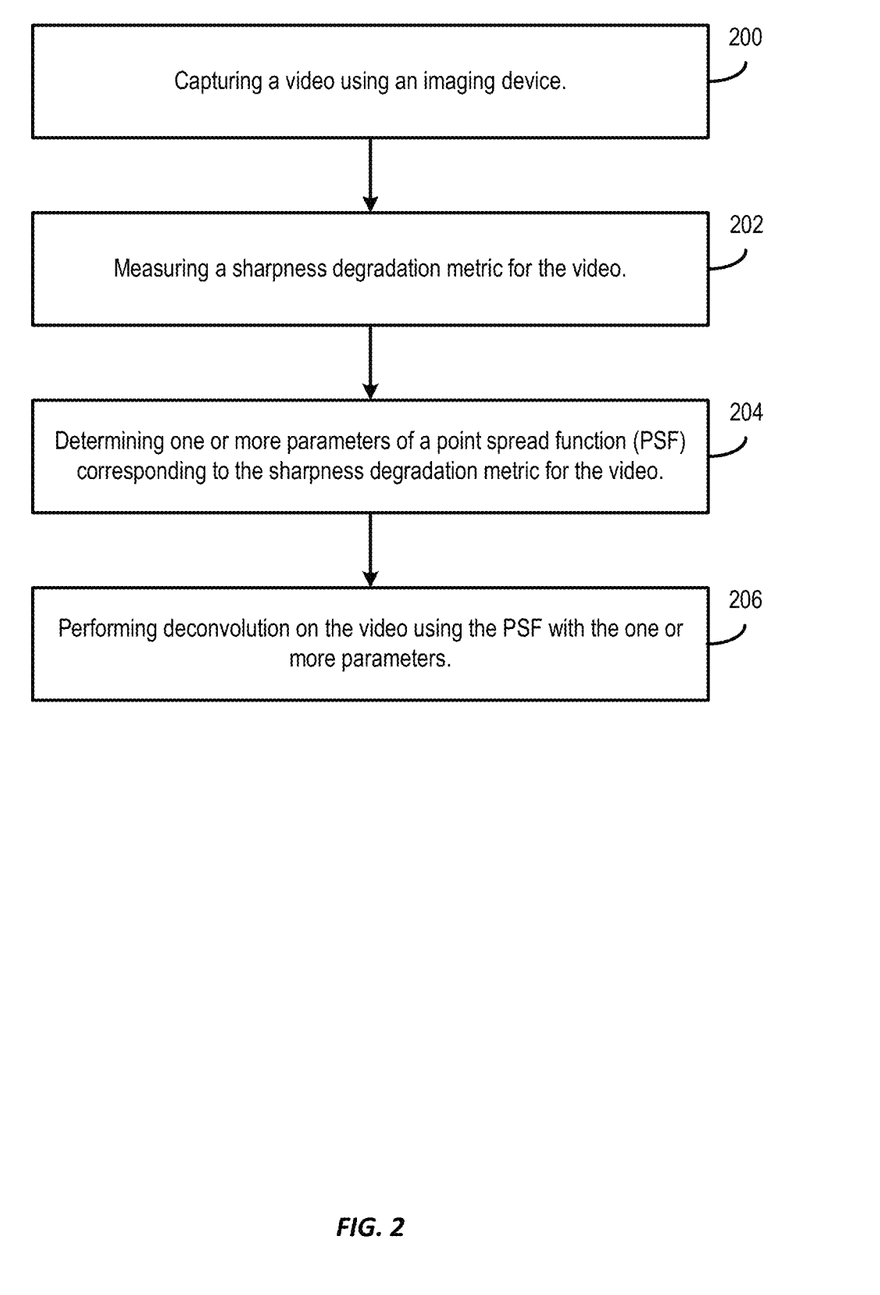
FIG. 2 shows a method of identifying and removing distortion from an image or video, in accordance with an embodiment.

FIG. 2 shows a method of identifying and removing distortion from an image or video, in accordance with an embodiment. In accordance with an embodiment, the coefficients of the equation identified offline using training videos, can be incorporated into an imaging device for use in processing newly captured images and/or video. At 200, new images and/or video can be captured using an imaging device. These new images and/or video can be captured live by the imaging device or may have been captured by the imaging device and stored in a database, memory, or other data structure accessible to the imaging device or another image processing device. In accordance with an embodiment, the new images and/or video can be captured by a first imaging device and transmitted or otherwise sent to a second imaging device for processing.

At 202, the imaging device can measure a sharpness degradation metric for the new video. As described above, the sharpness degradation metric can be determined by identifying the sharpness of a mean image in the new video and normalizing it against the sharpness of an individual frame of the new video. In accordance with an embodiment, the sharpness of an image can be determined by computing the image's average gradient magnitude. The image's average gradient magnitude can be determined using an edge detection algorithm, such as the Sobel operator. By using an edge detection algorithm, such as the Sobel operator, the gradient magnitudes of edges in an image can be determined and summed. For a given image, a large average gradient magnitude corresponds to a sharp image, whereas a small average gradient magnitude corresponds to a distorted image.

In accordance with an embodiment, these values can be expressed by the following equations:

$$\text{Mean image sharpness} = \frac{1}{Nm} \sum_{x,y \in Rm} \text{gradient magnitude of mean image at } x, y \quad \text{(Eq. 1)}$$

$$\text{Individual image sharpness} = \frac{1}{Ni} \sum_{x,y \in Ri} \text{gradient magnitude of individual image at } x, y \quad \text{(Eq. 2)}$$

$$\text{Sharpness degradation metric} = \frac{\text{mean image sharpness}}{\text{individual image sharpness}} \quad \text{(Eq. 3)}$$

In the above equations, Rm and Ri=the set of all x, y coordinates of pixels in the region of interest whose gradient magnitude is above a pre-defined threshold in the mean and individual images respectively. In accordance with an embodiment, the region of interest can include the entire image or a portion of the image. Nm and Ni=the number of pixels in the region of interest whose gradient magnitude is above the threshold in the mean and individual images respectively.

At 204, one or more parameters of the PSF corresponding to the sharpness degradation metric can be determined. In accordance with an embodiment, the best fit equation determined during the training mode can be used to determine the appropriate PSF parameters. As described above, the coefficients of the best fit equation calculated during training can be stored on the imaging device. These coefficients can be used to reconstruct the best fit equation. Then, using the sharpness degradation metric as the independent variable in the equation, the parameter(s) of the point spread function can be calculated. At 206, using the predetermined PSF and the appropriate PSF parameters calculated using the best fit equation, a deconvolution process can be applied to the video to obtain an undistorted video.

In accordance with an embodiment, a new sharpness degradation metric and PSF can be calculated for each frame in the new video being captured. Alternatively, new values can be calculated periodically, for example every M frames a new sharpness degradation metric and parameters of the PSF can be calculated and used in the deconvolution process. The number of frames between recalculations can be a variable configurable by the system designer to tailor the process to the particular application and system resources available.

Figure 3:
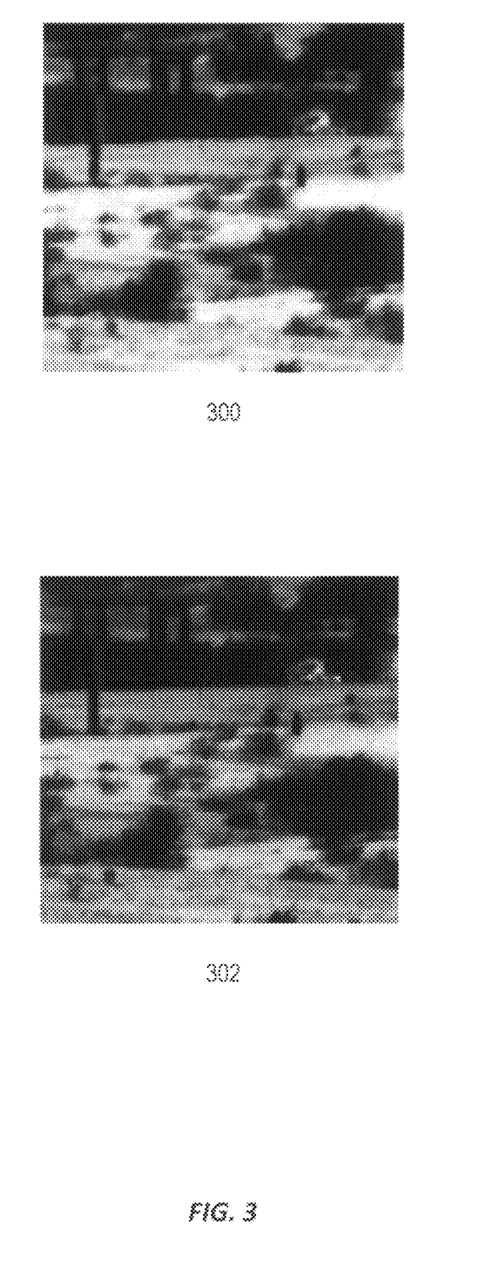
FIG. 3 shows exemplary results of removing atmospheric turbulence from an image, in accordance with an embodiment.

FIG. 3 shows exemplary results of removing atmospheric turbulence from an image, in accordance with an embodiment. As shown in FIG. 3, image 300 has not been processed. It includes atmospheric distortion making it more difficult to identify objects in the image. After applying the methods described above, output image 302 is produced. This image is considerably sharper and exhibits considerably less distortion than the unprocessed image 300.

Figure 4:
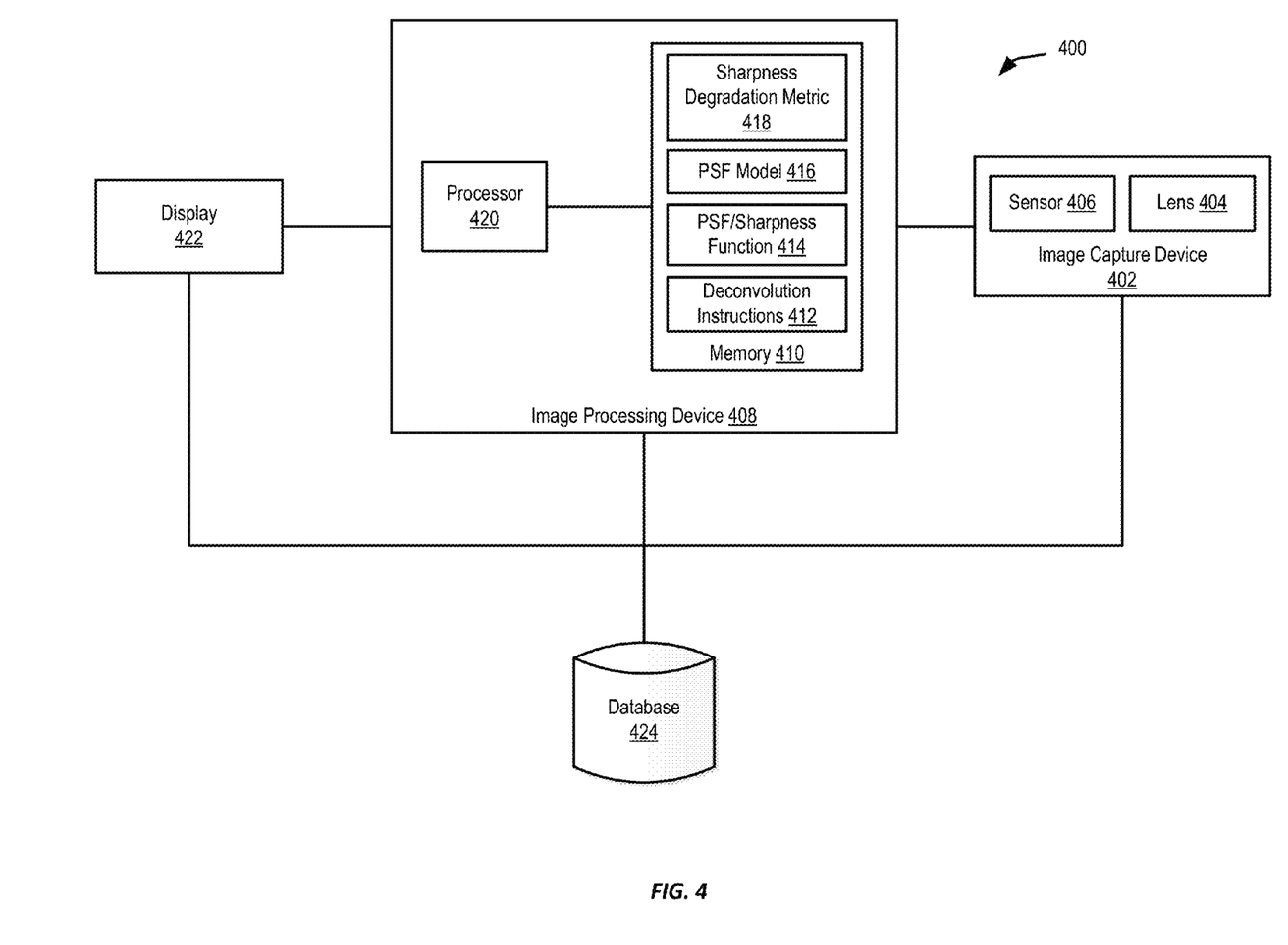
FIG. 4 shows a block diagram of an imaging system 400, in accordance with an embodiment.

FIG. 4 shows a block diagram of an imaging system 400, in accordance with an embodiment. Imaging system 400 can include an image capture device 402, such as a digital camera, that includes a lens 404 and digital sensor 406, such as a charge coupled device (CCD) or CMOS sensor. Image capture device 402 can capture still images and/or video. In some embodiments, images and/or video captured by image capture device 402 can be stored in a database 424 or other data structure for later processing. In some embodiments, the images and/or video can be sent to an image processing device 408 to be processed in real time. Image processing device 408 and image capture device 402 can be integrated into the same device such as a portable imaging system carried by a user or an unmanned aerial vehicle (UAV). In some embodiments, image processing device 408 can be remotely connected to image capture device 402 through a network connection (e.g., local area network, wide area network, the internet, etc.), wireless connection (e.g., a cellular data network, ground-based radio network connection, a satellite network connection, etc.), or other remote connection.

Image processing device 408 can include a memory 410 that includes instructions and/or data to perform the deconvolution methods described above with respect to FIGS. 1-3, including one or more deconvolution methods 412, coefficients for one or more best fit equations 414 that correlate PSF parameters to sharpness degradation metrics, a predetermined PSF model 416, and instructions 418 for determining a sharpness degradation metric of an image. The methods stored in memory 410 can be implemented using a general purpose microprocessor, special purpose microprocessor, digital signal processor (DSP), field programmable gate array (FPGA), or other integrated circuit or processor 420. Image processing device 408 can receive images and/or video from image capture device 402, or retrieve previously captured images and/or video from database 424, and analyze and perform deconvolution on the images and/or video. The output of the image processing device 408 can be sent to a display 422 to be displayed to a user and/or can be saved to database 424 for later viewing. Although a single database 424 is shown, a plurality of databases accessible to one or more of the image capture device 402, image processing device 408, and display 422, can be used to store images and/or video at various stages of processing. In some embodiments, display 422, image processing device 408, and/or image capture device 402 can be integrated into the same device. In alternative embodiments, display 422 can be remotely connected to image processing device 408.

Figure 5:
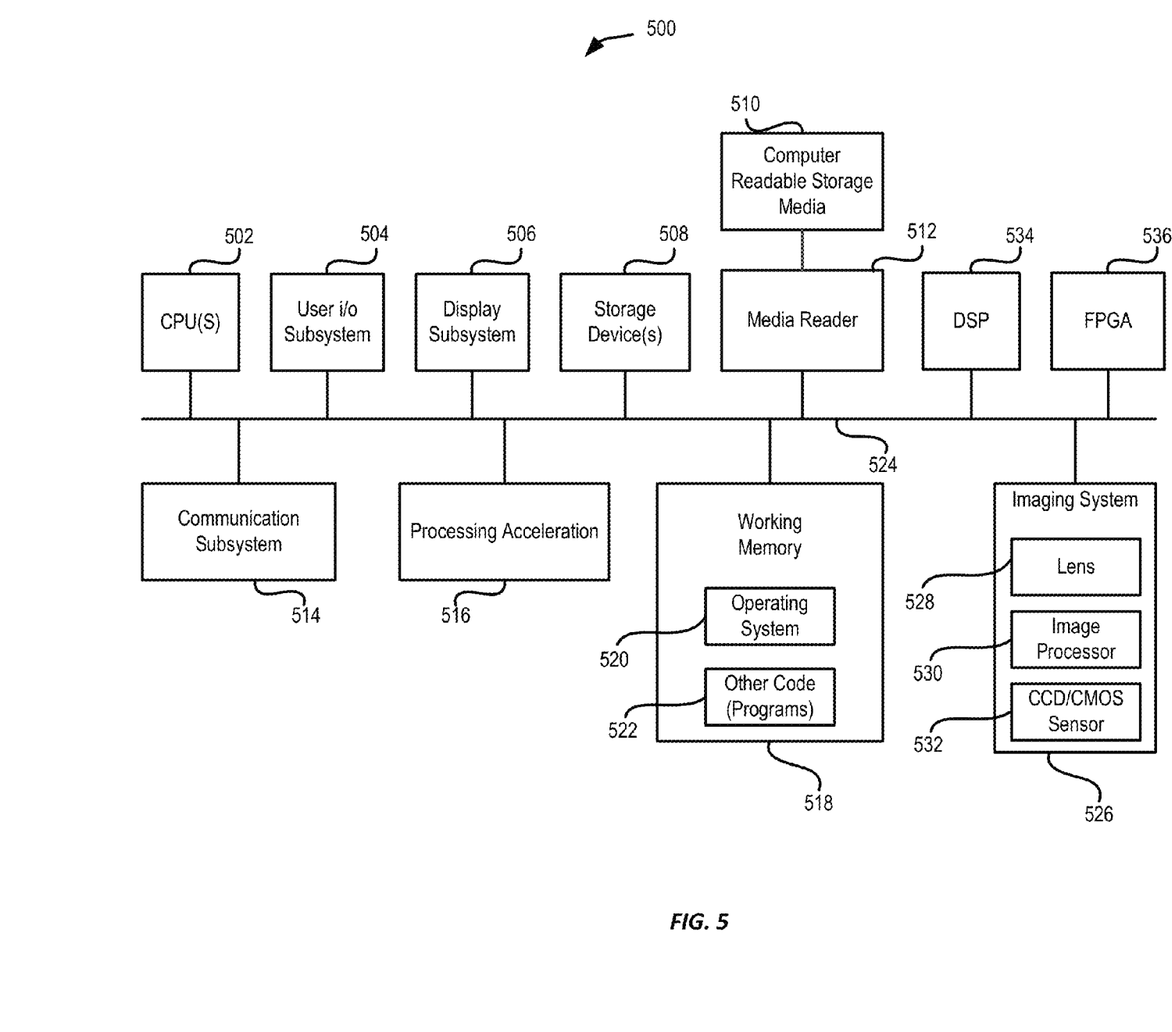
FIG. 5 shows a system for removing distortion from an image or video, in accordance with an embodiment.

FIG. 5 shows a system for removing distortion from an image, in accordance with an embodiment. FIG. 5 is a simplified block diagram of a computing system 500 that may be used in accordance with embodiments of the present invention. In accordance with an embodiment, computing system 500 can be incorporated into a portable device which can be carried by a user, such as a digital camera device, or incorporated into a larger system such as an unmanned aerial vehicle (UAV) or other system.

Computer system 500 is shown comprising hardware elements that may be electrically coupled via a bus 524. The hardware elements may include one or more central processing units (CPUs) 502, one or more input devices 504 (e.g., a mouse, a keyboard, touchscreen, etc.), and one or more output devices 506 (e.g., a display device, a printer, etc.). The computer system may also include a digital imaging system 526. The digital imaging system, such as a digital camera system, can include a lens 528, an image processor 530 and a digital image sensor such as a charge coupled device (CCD) or a complementary metal-oxide-semiconductor (CMOS) sensor. The CPUs may include single or multicore CPUs. Additionally, or alternatively, the computer system 500 may be implemented using one or more digital signal processors (DSPs) 534 and/or field programmable gate arrays (FPGAs) 536.

Computer system 500 may also include one or more storage devices 508. By way of example, the storage device(s) 508 may include devices such as disk drives, optical storage devices, and solid-state storage devices such as a random access memory (RAM) and/or a read-only memory (ROM), which can be programmable, flash-updateable and/or the like.

Computer system 500 may additionally include a computer-readable storage media reader 512, a communications subsystem 514 (e.g., a modem, a network card (wireless or wired), an infra-red communication device, etc.), and working memory 518, which may include RAM and ROM devices as described above. In some embodiments, computer system 500 may also include a processing acceleration unit 516, which can include a digital signal processor (DSP), a special-purpose processor, Field Programmable Gate Array (FPGA) and/or the like.

Computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. Communications system 514 may permit data to be exchanged with a wireless or wired network and/or any other computer connected to that network. In particular, the communications system 514 is operable to, e.g., receive instructions and transmit image and/or video data captured using camera system 526.

Computer system 500 may also comprise software elements, shown as being currently located within working memory 518, including an operating system 520 and/or other code 522, such as an application program (which may be a client application, Web browser, etc.). In an exemplary embodiment, working memory 518 can include the best fit equation coefficients, and the image processing methods described above with respect to FIGS. 1-3. It should be appreciated that alternative embodiments of computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data. Examples of storage and computer-readable media include RAM, ROM, EEPROM, flash memory or other memory technology, CD-ROM, digital versatile disk (DVD) or other optical storage, magnetic cassettes, magnetic tape, magnetic disk storage or other magnetic storage devices, or any other memory medium which can be used to store the desired information and which can be read by a computer. Storage media and computer readable media may include non-transitory memory devices.

Having disclosed several embodiments, it will be recognized by those of skill in the art that various modifications, alternative constructions, and equivalents may be used without departing from the spirit of the disclosed embodiments. Additionally, a number of well-known processes and elements have not been described in order to avoid unnecessarily obscuring the present technology. Accordingly, the above description should not be taken as limiting the scope of the technology.

As used herein and in the appended claims, the singular forms "a", "an", and "the" include plural references unless the context clearly dictates otherwise. Thus, for example, reference to "a processor" includes a plurality of such devices, and reference to "the subsystem" includes references to one or more subsystems and equivalents thereof known to those skilled in the art, and so forth.

What is claimed is:

1. A method of image deconvolution, comprising:
    capturing a video comprising a plurality of frames using an imaging device;
    measuring a sharpness degradation metric for the video, wherein measuring a sharpness degradation metric for the video comprises:
        determining a mean image in the video using a subset of frames from the plurality of frames of the video;
        determining a first sharpness metric for the mean image;
        determining a second sharpness metric for a frame from the plurality of frames; and
        dividing the first sharpness metric by the second sharpness metric;
    determining one or more parameters of a point spread function (PSF) corresponding to the sharpness degradation metric;
    performing deconvolution on at least one frame of the video using the PSF with the one or more parameters.

2. The method of claim 1, wherein the first and second sharpness metrics are determined using an edge detection algorithm.

3. The method of claim 1, wherein determining one or more parameters of a point spread function (PSF) corresponding to the sharpness degradation metric, further comprises:
    calculating the one or more parameters using a predetermined equation based on the sharpness degradation metric.

4. The method of claim 3, wherein the predetermined equation is generated by:
    identifying one or more parameters of a PSF for each of a plurality of training videos;
    determining a sharpness degradation metric for each of the plurality of training videos; and
    determining an equation to relate the parameters of the PSF for each of the plurality of training videos to the sharpness degradation metrics determined for each of the plurality of training videos using a curve fitting algorithm.

5. The method of claim 4, wherein the curve fitting algorithm is a method of least squares.

6. A system, comprising:
    an image capture device configured to capture video comprising a plurality of frames; and
    an image processing device configured to receive the video, wherein the image processing device is further configured to:
        measure a sharpness degradation metric for the video by calculating a mean image in the video using a subset of frames from the plurality of frames of the video, determining a first sharpness metric for the mean image, determining a second sharpness metric for a frame from the plurality of frames, and dividing the first sharpness metric by the second sharpness metric;
        determine one or more parameters of a point spread function (PSF) corresponding to the sharpness degradation metric;

perform deconvolution on at least one frame of the video using the PSF with the one or more parameters.

7. The system of claim 6, wherein the image capture device stores the captured video in a database, and wherein the image processing device receives the video from the database.

8. The system of claim 6, wherein the image processing device receives the video from the image capture device in real time.

9. The system of claim 6, wherein the first and second sharpness metrics are determined using an edge detection algorithm.

10. The system of claim 6, wherein to determine one or more parameters of a point spread function (PSF) corresponding to the sharpness degradation metric, the image processing device is further configured to:
    calculate the one or more parameters using a predetermined equation based on the sharpness degradation metric.

11. The system of claim 10, wherein the predetermined equation is generated by:
    identifying one or more parameters of a PSF for each of a plurality of training videos;
    determining a sharpness degradation metric for each of the plurality of training videos; and
    determining an equation to relate the parameters of the PSF for each of the plurality of training videos to the sharpness degradation metrics determined for each of the plurality of training videos using a curve fitting algorithm.

12. The system of claim 11, wherein the curve fitting algorithm is a method of least squares.

13. A non-transitory computer readable storage medium including instructions stored thereon which, when executed by a processor, cause the processor to perform a method, comprising:
    capturing a video comprising a plurality of frames using an imaging device;
    measuring a sharpness degradation metric for the video, wherein measuring a sharpness degradation metric for the video comprises:
        determining a mean image in the video using a subset of frames from the plurality of frames of the video;
        determining a first sharpness metric for the mean image;
        determining a second sharpness metric for a frame from the plurality of frames; and
        dividing the first sharpness metric by the second sharpness metric;
    determining one or more parameters of a point spread function (PSF) corresponding to the sharpness degradation metric; and
    performing deconvolution on at least one frame of the video using the PSF with the one or more parameters.

14. The non-transitory computer readable storage medium of claim 13, wherein the first and second sharpness metrics are determined using an edge detection algorithm.

15. The non-transitory computer readable storage medium of claim 13, wherein determining one or more parameters of a point spread function (PSF) corresponding to the sharpness degradation metric, further comprises:
    calculating the one or more parameters using a predetermined equation based on the sharpness degradation metric.

16. The non-transitory computer readable storage medium of claim 15, wherein the predetermined equation is generated by:
    identifying one or more parameters of a PSF for each of a plurality of training videos;
    determining a sharpness degradation metric for each of the plurality of training videos; and
    determining an equation to relate the parameters of the PSF for each of the plurality of training videos to the sharpness degradation metrics determined for each of the plurality of training videos using a curve fitting algorithm.

17. The non-transitory computer readable storage medium of claim 16, wherein the curve fitting algorithm is a method of least squares.

* * * * *